(12) United States Patent
Nagae et al.

(10) Patent No.: US 9,221,031 B2
(45) Date of Patent: Dec. 29, 2015

(54) INORGANIC MATERIAL COMPRISING PHOTOCATALYST LAYER, METHOD FOR PRODUCING SAME, AND PHOTOCATALYST COATING LIQUID FOR INORGANIC MATERIAL

(75) Inventors: Tatsushi Nagae, Gifu-ken (JP);
Yoshiyuki Nakanishi, Gifu-ken (JP);
Soshi Oyama, Fukuoka-ken (JP);
Hideki Kobayashi, Gifu-ken (JP);
Fumiyuki Takasaki, Osaka-fu (JP)

(73) Assignees: Toto Ltd., Fukuoka (JP); Dailchi Kigenso Kagaku Kogyo Co., Ltd., Osaka (JP)

( * ) Notice: Subject to any disclaimer, the term of this patent is extended or adjusted under 35 U.S.C. 154(b) by 237 days.

(21) Appl. No.: 13/812,918

(22) PCT Filed: Jul. 26, 2011

(86) PCT No.: PCT/JP2011/066967
§ 371 (c)(1),
(2), (4) Date: Apr. 1, 2013

(87) PCT Pub. No.: WO2012/014893
PCT Pub. Date: Feb. 2, 2012

(65) Prior Publication Data
US 2013/0216458 A1 Aug. 22, 2013

(30) Foreign Application Priority Data
Jul. 29, 2010 (JP) .................................. 2010-170072

(51) Int. Cl.
*B01J 21/16* (2006.01)
*B01J 21/06* (2006.01)
*B01J 35/00* (2006.01)
*B01J 37/02* (2006.01)
*C04B 41/50* (2006.01)
*C09D 1/02* (2006.01)
*C09D 7/12* (2006.01)
*B01J 35/02* (2006.01)
*B01J 35/10* (2006.01)
*B01D 53/00* (2006.01)
*C09D 5/16* (2006.01)
*C04B 111/00* (2006.01)
*C08K 3/20* (2006.01)

(52) U.S. Cl.
CPC ............... *B01J 21/16* (2013.01); *B01D 53/00* (2013.01); *B01J 21/066* (2013.01); *B01J 35/004* (2013.01); *B01J 35/006* (2013.01); *B01J 35/023* (2013.01); *B01J 35/1014* (2013.01); *B01J 37/0215* (2013.01); *C04B 41/5089* (2013.01); *C09D 1/02* (2013.01); *C09D 5/1618* (2013.01); *C09D 7/1216* (2013.01); *C09D 7/1266* (2013.01); *C04B 2111/00827* (2013.01); *C08K 3/20* (2013.01)

(58) Field of Classification Search
CPC ....... B01J 21/16; B01J 35/1014; B01J 35/006; B01J 35/023; B01J 37/0215; B01J 35/004; B01J 21/066; C09D 5/1618; C09D 7/1216; C09D 7/1266; C09D 1/02; B01D 53/00; C04B 41/5089; C04B 2111/00827; C08K 3/20
See application file for complete search history.

(56) References Cited

U.S. PATENT DOCUMENTS

| | | | |
|---|---|---|---|
| 6,013,372 A | 1/2000 | Hayakawa et al. | |
| 6,090,489 A | 7/2000 | Hayakawa et al. | |
| 6,228,480 B1 * | 5/2001 | Kimura et al. | 428/328 |
| 6,337,301 B1 | 1/2002 | Ohmori et al. | |
| 6,368,668 B1 * | 4/2002 | Kobayashi et al. | 427/376.2 |
| 6,569,520 B1 | 5/2003 | Jacobs | |
| 6,673,433 B1 | 1/2004 | Saeki et al. | |
| 6,716,513 B1 | 4/2004 | Hasuo et al. | |
| 6,830,785 B1 | 12/2004 | Hayakawa et al. | |
| 7,601,326 B2 | 10/2009 | Torardi | |
| 2005/0233893 A1 | 10/2005 | Sakatani et al. | |
| 2009/0061183 A1 * | 3/2009 | Muraguchi et al. | 428/212 |

FOREIGN PATENT DOCUMENTS

| | | | |
|---|---|---|---|
| JP | 63-083106 A | 4/1988 | |
| JP | 01-218622 A | 8/1989 | |
| JP | 2000-136370 A | 5/2000 | |
| JP | 2000-237597 A | 9/2000 | |
| JP | 2001-162176 A | 6/2001 | |
| JP | 2002-080829 A | 3/2002 | |
| JP | 2002080829 A * | 3/2002 | |
| JP | 2002-136869 A | 5/2002 | |
| JP | 2009-270040 A | 11/2009 | |
| WO | 99/28393 A1 | 6/1999 | |
| WO | 00/06300 A1 | 2/2000 | |

* cited by examiner

*Primary Examiner* — Anthony J Zimmer
(74) *Attorney, Agent, or Firm* — Carrier Blackman & Associates, P.C.; Joseph P. Carrier; William D. Blackman

(57) ABSTRACT

Disclosed is an inorganic material that can exhibit an excellent photocatalytic gas decomposition function while maintaining an abrasion resistance on a level that is usually required of this type of inorganic materials. The inorganic material includes an inorganic material base and a photocatalyst layer that is formed by firing and is provided on the surface of the inorganic material base, the photocatalyst layer containing: photocatalyst particles; zirconia particles having a BET specific surface area of not less than 10 $m^2/g$ or crystalline zirconia particles having a mean crystallite diameter of less than 20 nm; and an alkali silicate. The inorganic material including the photocatalyst layer exhibits a high photocatalytic gas decomposition function while maintaining an abrasion resistance on a level that is usually required of this type of inorganic materials.

6 Claims, No Drawings

INORGANIC MATERIAL COMPRISING PHOTOCATALYST LAYER, METHOD FOR PRODUCING SAME, AND PHOTOCATALYST COATING LIQUID FOR INORGANIC MATERIAL

RELATED APPLICATION

This application is based upon and claims the benefit of priority from the prior Japanese Patent Application No. 170072/2010, filed on Jul. 29, 2010, the entire contents of which are incorporated herein by reference.

TECHNICAL FIELD

The present invention relates to an inorganic material comprising a photocatalyst layer, a process for producing the same, and a photocatalyst coating liquid for an inorganic material.

BACKGROUND ART

Photocatalysts such as titanium oxide have recently become extensively utilized. The use of photocatalysts can realize the decomposition of various harmful substances such as NOx by taking advantage of photoenergy.

Various proposals have hitherto been made on techniques that decompose NOx with photocatalysts (for example, JP H01(1989)-218622A (PTL 1) and JP 2001-162176A (PTL 2)).

In JP H01(1989)-218622A (PTL 1), a photocatalyst and activated carbon as a gas adsorbent are incorporated. Since, however, the activated carbon is not resistant to heat, this composition cannot be utilized after firing.

In JP 2001-162176A (PTL 2), a mixture composed of photocatalyst particles, a weakly acidic oxide such as $ZrO_2$, and a fluororesin binder is fixed onto a glass fiber cloth by heat treatment at 370° C. for 2 min. Since, however, the fluororesin is soft, satisfactory abrasion resistance cannot be obtained.

On the other hand, various proposals have also been made on techniques that form a photocatalyst layer on fired building materials such as tiles (for example, JP S63(1988)-83106A (PTL 3), JP 2000-136370A (PTL 4), and WO 00/06300 pamphlet (PTL 5).

In JP S63(1988)-83106A (PTL 3), photocatalytic tiles are obtained by coating a titanium tetraisopropoxide on a tile surface and firing the assembly at 480° C. for one hr. As far as the present inventors know, according to this method, when ensuring the fixation between a tile base material and a photocatalyst layer is contemplated, only a photocatalyst layer having a small thickness can be formed and, consequently, a satisfactory photocatalytic gas decomposition activity cannot be obtained.

In JP 2000-136370A (PTL 4), photocatalytic tiles are obtained by mixing photocatalytic titanium oxide particles and at least one material selected from the group consisting of alkali metals, alkaline earth metals, zinc, aluminum, platinum, palladium, ruthenium, alumina, zirconia, ceria, and yttria and firing the mixture at 880° C. for one hr. According to this method, the adhesion between the tile base material and the photocatalyst layer is satisfactory by virtue of firing at elevated temperatures of 880° C. or above, and, at the same time, the photocatalytic hydrophilizing function is satisfactory. As far as the present inventors know, however, a sintering reaction of titanium oxide occurs upon firing at 800° C. or above and grain growth of titanium oxide particles occurs, making it impossible to satisfactorily obtain a photocatalytic gas decomposition activity.

In WO 00/06300 (PTL 5), photocatalytic tiles are obtained by coating pohotoctalytic titanium oxide particles and an alkali silicate on a tile base material surface and rapidly heating the coated surface. According to this method, by virtue of heat treatment of the alkali silicate, the adhesion between the tile base material and the photocatalyst layer is satisfactory and, at the same time, the photocatalyst layer surface is relatively smooth. Accordingly, photocatalytic tiles are satisfactory, for example, in photocatalytic hydrophilizing function and photocatalytic antimicrobial function. As far as the present inventors know, no satisfactory photocatalytic gas decomposition activity can be obtained.

Further, various proposals have been made on techniques that, in forming a photocatalyst layer, use Zr (zirconium) materials in addition to photocatalyst particles (for example, WO 99/28393 pamphlet (PTL 6), JP 2009-270040A (PTL 7), and JP 2000-136370A (PTL 4)).

WO 99/28393 (PTL 6) discloses a technique that fixes photocatalytic titanium oxide particles having a specific surface area of 50 to 400 $m^2/g$ and at least one Zr compound selected from the group consisting of zirconium oxychloride, zirconium hydroxychloride, zirconium nitrate, zirconium sulfate, zirconium acetate, zirconium ammonium carbonate, zirconium potassium carbonate, zirconium ammonium carbonate, sodium zirconium phosphate, and zirconium propionate on a glass plate at 150° C. Here the Zr compund is utilized as a binder that fixes the photocatalytic titanium oxide particles onto the base material at low temperatures. As described in paragraph 29 of this document to the effect that "in the case of a heat-resistant base material, heat treatment can be carried out at 200 to 400° C. to sinter photocatalytic oxide particles," the function as the binder is rapidly deteriorated when the temperature exceeds 400° C. Accordingly, when firing is carried out at elevated temperatures of 400° C. or above, satisfactory abrasion resistance cannot be obtained.

JP 2009-270040A (PTL 7) discloses a technique that includes: mixing photocatalytic titanium oxide particles with an acidic sol that includes amorphous Zr—O particles having a particle diameter D50 of 1 to 30 nm dispersed in a dispersion medium, contains an inorganic acid and a carboxylic acid or salt thereof, and uses amorphous Zr—O particles having a zeta potential of not less than 20 mV as a dispersoid; and coating and fixing the mixture on a glass plate at 110° C. Here the amorphous Zr—O particles are utilized as a binder that fixes photocatalytic titanium oxide particles on a base material at low temperatures. When firing is carried out at an elevated temperature above 400° C., Zr—O particles are grown and satisfactory abrasion resistance cannot be obtained.

According to a similar experiment conducted by the present inventors, the Zr material particles could not be dispersed in a coating liquid containing photocatalytic titanium oxide particles and an alkali silicate, described in WO 00/06300 (PTL 5).

JP 2000-136370A (PTL 4) discloses a photocatalyst tile obtained by mixing photocatalytic titanium oxide particles and zirconia particles and firing the mixture at 880° C. for one hr. Here the zirconia particles are incorporated for photocatalytic hydrophilizing function improvement purposes. In this constitution, however, a sintering reaction of titanium oxide occurs upon firing at 800° C. or above and growth of titanium oxide particles occurs, making it impossible to obtain a satisfactory photocatalytic gas decomposition activity. Further, the zirconia particles are also grown and thus do not satisfactorily contribute to an improvement in photocatalytic gas decomposition activity.

CITATION LIST

Patent Literature

[PTL 1] JP H01(1989)-218622A
[PTL 2] JP 2001-162176A
[PTL 3] JP S63(1988)-83106A
[PTL 4] JP 2000-136370A
[PTL 5] WO 00/06300
[PTL 6] WO 99/28393
[PTL 7] JP 2009-270040A

SUMMARY OF THE INVENTION

The present inventors have now found that a high photocatalytic gas decomposition function can be exerted while maintaining satisfactory abrasion resistance by, in the formation of a photocatalyst layer by firing on the surface of an inorganic material base, incorporating zirconia particles in addition to photocatalyst particles and an alkali silicate in such a manner that, after firing, the BET surface area of the zirconia particles is maintained at not less than 10 $m^2/g$, or incorporating zirconia particles in addition to photocatalyst particles and an alkali silicate in such a manner that, after firing, the zirconia particles are converted to crystalline zirconia particles having a mean crystallite diameter of less than 20 nm.

An object of the present invention is to provide an inorganic material that can exert a high photocatalytic gas decomposition function while maintaining satisfactory abrasion resistance, a process for producing the same, and a photocatalyst coating liquid for an inorganic material.

According to the present invention, there is provided an inorganic material comprising a photocatalyst layer, wherein the photocatalyst layer is formed by firing on the surface of an inorganic material base and contains at least photocatalyst particles, zirconia particles having a BET specific surface area of not less than 10 $m^2/g$, and an alkali silicate, or wherein the photocatalyst layer is formed by firing on the surface of an inorganic material base and contains at least photocatalyst particles, crystalline zirconia particles having a mean crystallite diameter of less than 20 nm, and an alkali silicate.

According to the present invention, there is also provided a process for producing the inorganic material comprising a photocatalyst layer, the process being any one of the following processes (1) and (2).

(1) A process comprising: applying a coating liquid on the surface of an inorganic material base, the coating liquid comprising photocatalyst particles, amorphous Zr—O particles having a particle diameter D50 of 1 to 30 nm, and an alkali silicate; and then bringing the temperature of the surface to 300° C. or more to less than 800° C. to form a photocatalyst layer.

(2) A process comprising: applying a coating liquid on the surface of an inorganic material base, the coating liquid comprising photocatalyst particles, zirconium ammonium carbonate, and an alkali silicate; and then bringing the temperature of the surface to more than 400° C. to 800° C. or less to form a photocatalyst layer.

Further, according to the present invention, there is provided a photocatalytic coating liquid for an inorganic material, the coating liquid being any one of the following coating liquids (1) and (2).

(1) A photocatalytic coating liquid for an inorganic material, comprising at least photocatalyst particles, amorphous Zr—O particles having a particle diameter D50 of 1 to 30 nm, an alkali silicate, and a basic solvent, the photocatalyst coating liquid being adapted for use in the formation of a photocatalyst layer on the surface of an inorganic material base by applying the coating liquid on the surface of the inorganic material base and firing the coating.

(2) A photocatalytic coating liquid for an inorganic material, comprising at least photocatalyst particles, zirconium ammonium carbonate, and an alkali silicate and being basic, the photocatalyst coating liquid being adapted for use in the formation of a photocatalyst layer on the surface of an inorganic material base by applying the coating liquid on the surface of the inorganic material base and firing the coating.

According to another aspect of the present invention, there is provided use of the above inorganic material according to the present invention, for decomposing a harmful gas.

According to a further aspect of the present invention, there is provided a method for decomposing a harmful gas, the method comprising bringing the above inorganic material according to the present invention into contact with a gas containing a harmful gas.

The inorganic material comprising a photocatalyst layer according to the present invention has the effect of exerting a high photocatalytic gas decomposition function while maintaining satisfactory abrasion resistance.

MODE FOR CARRYING OUT THE INVENTION

Inorganic Material Comprising Photocatalyst Layer

According to a first embodiment of the inorganic material according to the present invention, the BET specific surface area of the zirconia particles is not less than 10 $m^2/g$, more preferably not less than 20 $m^2/g$, still more preferably not less than 30 $m^2/g$, most preferably not less than 50 $m^2/g$. The use of such zirconia particles can realize an inorganic material that has a high photocatalytic gas decomposition function while maintaining satisfactory abrasion resistance.

According to a second embodiment of the inorganic material according to the present invention, the mean crystallite diameter of the zirconia particles is less than 20 nm, more preferably less than 15 nm, most preferably less than 10 nm. The use of such zirconia particles can realize an inorganic material that has a high photocatalytic gas decomposition function while maintaining satisfactory abrasion resistance.

According to a preferred embodiment of the present invention, the content of the alkali silicate in the photocatalyst layer is preferably 0.5% by mass (inclusive) to 20% by mass (exclusive), more preferably 1% by mass (inclusive) to 20% by mass (exclusive), still more preferably 3% by mass (inclusive) to 20% by mass (exclusive), still more preferably 4% by mass (inclusive) to 15% by mass (exclusive), most preferably 5% by mass (inclusive) to 10% by mass (exclusive), in terms of $SiO_2$. Good abrasion resistance can be exerted when the content of the alkali silicate in the photocatalyst layer is not less than 3% by mass, more preferably not less than 4% by mass, most preferably not less than 5% by mass. Further, an inorganic material having a high photocatalytic gas decomposition function can be realized when the content of the alkali silicate in the photocatalyst layer is less than 20% by mass, more preferably less than 15% by mass, most preferably less than 10% by mass.

In the present invention, at least one base selected from the group consisting of tiles, ceramic wares such as large ceramic ware panels, natural stones, porcelain enamels, ceramics, glass, and concrete is suitable as the inorganic material base.

Ceramic ware bases may be any of ceramic bases, stoneware bases, and porcelain bases. Further, both glazed products and unglazed products can be utilized. The shape and applications are also not particularly limited. The present invention is suitable in building materials, interiors, exteriors, windows, toilet bowls, washbowls, sinks, unit kitchens, tomb stones, bridge beams, bridges, insulators, ceramic ware plugs and the like.

In the present invention, as long as photocatalyst particles are present in the base surface, the photocatalyst layer may be in a completely film form, or alternatively may be, for example, in a partially film form. Further, the photocatalyst layer may also be discretely present in an island form on the surface of the base. According to a preferred embodiment of the present invention, the photocatalyst layer is obtained by applying a coating liquid.

In the present invention, in order to obtain satisfactory abrasion resistance, the photocatalyst layer should be adhered to the inorganic material base with desired strength. To this end, firing treatment is carried out. In this firing treatment, any method may be carried out as long as heat is satisfactorily spread to the interface of the photocatalyst layer and the inorganic material base. Specifically, the whole inorganic material comprising the photocatalyst layer may be heated, or alternatively the surface of the inorganic material base with the photocatalyst layer formed thereon may be partially heated.

In the present invention, the thickness of the photocatalyst layer is preferably 0.1 µm to 3 µm, more preferably 0.3 µm to 3 µm. When the thickness is the above-defined range, a high photocatalytic gas decomposition function can be exerted while maintaining design and texture inherent in the inorganic material base and maintaining satisfactory abrasion resistance.

In the present invention, the mass ratio between the photocatalyst particles and the zirconium particles in the photocatalyst layer is preferably 80/20 to 20/80, more preferably 75/25 to 30/70. When the mass ratio is in the above-defined range, an inorganic material having a high photocatalytic gas decomposition function can be realized.

The photocatalyst particles used in the present invention are not particularly limited as long as the particles have a photocatalytic activity. Examples of preferred photocatalyst particles include particles of metal oxides, for example, titanium oxide such as anatase form of titanium oxide, rutile form of titanium oxide, and brookite form of titanium oxide and zinc oxide, tin oxide, strontium titanate, and tungsten oxide. Titanium oxide particles are more preferred, and anatase form of titanium oxide particles are most preferred.

Photocatalyst particles having a mean particle diameter of 10 nm to 100 nm are preferred from the viewpoint of stably developing gas decomposition activity. Photocatalyst particles having a mean particle diameter of 10 nm to 60 nm are more preferred.

Lithium silicate, sodium silicate, potassium silicate, mixtures thereof and the like are suitable as the alkali silicate used in the present invention.

The BET specific surface area of the zirconia particles present in the photocatalyst layer according to the present invention is not less than 10 $m^2/g$, more preferably not less than 20 $m^2/g$, still more preferably not less than 30 $m^2/g$, most preferably not less than 50 $m^2/g$.

The zirconia particles present in the photocatalyst layer according to the present invention are crystalline zirconia particles having a mean crystallite diameter of less than 20 nm, more preferably less than 15 nm, most preferably less than 10 nm. The lower limit of the mean crystallite diameter of the zirconia particles is 2 nm. When the zirconia particles are crystalline, the crystal form may be any of monoclinic, tetragonal, cubic, rhombohedral, orthorhombic and other crystals. Among them, monoclinic and tetragonal crystals are preferred, and tetragonal crystals are most preferred.

According to a preferred embodiment of the present invention, photocatalyst layer may further contain inorganic oxide particles other than the photocatalyst particles and the zirconia particles. Such inorganic oxide particles usable herein include particles of single oxides such as alumina, ceria, yttria, boronia, magnesia, calcia, ferrite, amorphous titania, and hafnia and particles of composite oxides such as barium titanate and calcium silicate.

Further, in a preferred embodiment of the present invention, in order to develop high level of antimicrobial, antivirus, and fungicidal properties, at least one metal selected from the group consisting of vanadium, iron, cobalt, nickel, palladium, zinc, ruthenium, rhodium, copper, cuprous oxide, cupric oxide, silver, silver oxide, platinum, and gold and/or a compound of the metal may be present in the photocatalyst layer. The amount of the metal and/or the metal compound is preferably approximately 0.001 to 10% by mass, more preferably 0.05 to 5% by mass, based on the photocatalyst particles.

Process for Producing Inorganic Material Comprising Photocatalyst Layer

In a first embodiment of a process for producing an inorganic material according to the present invention, the process comprises: applying a coating liquid on the surface of an inorganic material base, the coating liquid comprising at least photocatalyst particles, amorphous Zr—O particles having a particle diameter D50 of 1 to 30 nm, and an alkali silicate; and then bringing the temperature of the surface to 300° C. or more to less than 800° C., preferably 300° C. to 600° C., most preferably 300° C. to 400° C., to form a photocatalyst layer.

In a second embodiment of a process for producing an inorganic material according to the present invention, the process comprises: applying a coating liquid on the surface of an inorganic material base, the coating liquid comprising at least photocatalyst particles, zirconium ammonium carbonate, and an alkali silicate; and then bringing the temperature of the surface to more than 400° C. to 800° C. or more to form a photocatalyst layer.

One base selected from the group consisting of tiles, ceramic wares such as large ceramic ware panels, natural stones, porcelain enamels, ceramics, glass, and concrete is suitable as the inorganic material base. Ceramic ware bases may be any of ceramic bases, stoneware bases, and porcelain bases. Further, both glazed products and unglazed products can be utilized.

The shapes and applications are also not particularly limited. The present invention is suitable in building materials, interiors, exteriors, windows, toilet bowls, washbowls, sinks, unit kitchens, tomb stones, bridge beams, bridges, insulators, ceramic ware plugs and the like.

In the first embodiment, the coating liquid used in the present invention contains photocatalyst particles, amorphous Zr—O particles having a particle diameter D50 of 1 to 30 nm, and an alkali silicate.

In the second embodiment, the coating liquid used in the present invention contains photocatalyst particles, zirconium ammonium carbonate, and an alkali silicate.

The photocatalyst particles used in the present invention are not particularly limited as long as the particles have a photocatalytic activity after firing. Examples of preferred photocatalyst particles include particles of metal oxides, for example, titanium oxide such as anatase form of titanium oxide, rutile form of titanium oxide, and brookite form of titanium oxide and zinc oxide, tin oxide, strontium titanate, and tungsten oxide. Titanium oxide particles are more preferred, and anatase form of titanium oxide particles are most preferred.

The mean particle diameter of the photocatalyst particles used in the present invention is preferably 10 nm to 100 nm, more preferably 10 nm to 60 nm.

Lithium silicate, sodium silicate, potassium silicate, mixtures thereof and the like are suitable as the alkali silicate used in the present invention.

In a preferred embodiment of the present invention, the content of the alkali silicate based on the whole solid content of the coating liquid is preferably 3% by mass (inclusive) to 20% by mass (exclusive), more preferably 4% by mass (inclusive) to 15% by mass (exclusive), most preferably 5% by mass (inclusive) to 10% by mass (exclusive), in terms of $SiO_2$.

In the first embodiment of the process in the present invention, the mass ratio between the photocatalyst particles and amorphous Zr—O particles having a particle diameter D50 of 1 to 30 nm in terms of $ZrO_2$ is preferably 80/20 to 20/80, more preferably 75/25 to 30/70.

In the second embodiment of the process in the present invention, the mass ratio between the photocatalyst particles and the zirconium ammonium carbonate in terms of $ZrO_2$ is preferably 80/20 to 20/80, more preferably 75/25 to 30/70.

The amorphous Zr—O particles having a particle diameter D50 of 1 to 30 nm used in the present invention may be any amorphous Zr—O particles as long as Zr and O are contained as constituent elements, and examples thereof include particles of zirconium hydroxide ($Zr(OH)_4$), zirconyl hydroxide ($ZrO(OH)_2$), hydrated zirconium oxide ($ZrO_2 \cdot xH_2O$), zirconium oxide ($ZrO_2$), and mixtures thereof.

Preferably, the coating liquid used in the present invention contains carbonic acid chemical species at a molar ratio to Zr in Zr—O particles of 0.1 to 1.2. The carbonic acid chemical species may be chemical species produced in an aqueous solution produced when a water-soluble salt of carbonic acid is dissolved in water. Examples thereof include hydrogen carbonate ions ($HCO_3^-$) and carbonate ions ($CO_3^{2-}$). When the carbonic acid chemical species are added, the dispersibility of the coating liquid is improved. The carbonic acid chemical species are decomposed by heat treatment at 300° C. or above and thus do not adversely affect the coating liquid to be fired in use.

The coating liquid used in the present invention may contain one or a plurality of compounds selected from carboxylic acids or salts thereof, glycerol, and ethanolamines. The molar ratio of one or more compounds selected from carboxylic acids or salts thereof, glycerol, and ethanolamines to Zr is less than 0.2, preferably less than 0.05. These components are effective in stably maintaining the dispersion and, at the same time, are decomposed by heat treatment at 300° C. or above. Accordingly, these components do not adversely affect as a coating liquid to be fired in use. Citric acid, tartaric acid, glycolic acid, lactic acid, gluconi acid and the like are suitable as the carboxylic acid, and monoethanolamine, diethanolamine, triethanolamine and the like are suitable as the ethanolamine. As described later, the object of using the carboxylic acid or salt thereof is to supply the carboxylic acid to the sol, of which the dispersoid is amorphous Zr—O particles usable as a supply source of the amorphous Zr—O particles in the coating liquid, for stabilization. Accordingly, any carboxylic acid or salt thereof may be used as long as it is dissolvable in the sol including Zr—O particles as the dispersoid and a solvent of the coating liquid. Examples thereof include ammonium salts, sodium salts, and potassium salts.

The solvent for the coating liquid used in the present invention is preferably basic. The coating liquid is preferably aqueous. However, a mixture of water with ethanol may also be used. The pH value of the coating liquid is preferably 7.5 to 10.

The solid content concentration of the coating liquid used in the present invention is not particularly limited but is preferably 1 to 10% by mass from the viewpoint of easiness of coating. The coating composition may be analyzed for component determination by subjecting the coating liquid to ultrafiltration to separate the coating liquid into a particulate component and a filtrate, analyzing the particulate component and the filtrate, for example, by infrared spectroscopy, gel permeation chromatography, or X-ray fluorescence spectroscopy, and analyzing the spectra.

The coating liquid used in the present invention may contain inorganic oxide particles other than the photocatalyst particles and the zirconia particles. Such inorganic oxide particles usable herein include particles of single oxides such as alumina, ceria, yttria, boronia, magnesia, calcia, ferrite, amorphous titania, and hafnia and particles of composite oxides such as barium titanate and calcium silicate.

The coating liquid used in the present invention will be described later in more detail. The coating liquid may be applied onto the base by a commonly extensively used method such as brush coating, roller coating, spray coating, roll coater coating, flow coater coating, dip coating, flow coating, and screen printing.

In both the first embodiment and the second embodiment of the process according to the present invention, before the application of the coating liquid onto the base, the surface of the base may be preheated. The preheating is carried out by heating the surface of the base to 20° C. to 200° C. The photocatalyst coating composition coated onto the preheated surface of the base can be advantageously evenly spread to obtain an even coating film.

In the first embodiment, after the application of the coating liquid onto the inorganic material base, the coating is fired at a surface temperature of 300° C. or more to less than 800° C., preferably 300° C. to 600° C., most preferably 300° C. to 400° C., to form a photocatalyst layer on the inorganic material base.

The surface of the base on which the coating liquid has been applied may be brought to 300° C. or more to less than 800° C., preferably 300° C. to 600° C., most preferably 300° C. to 400° C., by gradually raising the temperature in an electric furnace or a gas furnace so as to reach the predetermined temperature. A method may also be adopted in which a high level of energy is instantaneously applied to the surface of the base for one sec to one min to bring only a portion around the surface, more preferably a portion from the surface of the inorganic material to the interface between the inorganic material base and the photocatalyst layer to 300° C. or more to less than 800° C., preferably 300° C. to 600° C., most preferably 300° C. to 400° C. The latter method is convenient when the inorganic material base is a relatively low heat resistant material base, for example, natural stone or concrete.

In the second embodiment, after the application of the coating liquid onto the inorganic material base, the coating is fired so that the coating liquid-applied surface is brought to more than 400° C. to 800° C. or less to form a photocatalyst layer on the inorganic material base.

The surface of the base on which the coating liquid has been applied may be brought to more than 400° C. to 800° C. or less by gradually raising the temperature in an electric furnace or a gas furnace so as to reach the predetermined temperature. A method may also be adopted in which a high level of energy is instantaneously applied to the surface of the base for one sec to one min to bring only a portion around the surface, more preferably a portion from the surface of the inorganic material to the interface between the inorganic material base and the photocatalyst layer to more than 400° C. to 800° C. or less. The latter method is convenient when the inorganic material base is a relatively low heat resistant material base, for example, natural stone or concrete.

Photocatalyst Coating Liquid for Inorganic Material

In a first embodiment of the photocatalyst coating liquid for an inorganic material according to the present invention, the photocatalyst coating liquid comprises at least photocatalyst particles, amorphous Zr—O particles having a particle diameter D50 of 1 to 30 nm, an alkali silicate, and a basic solvent, the photocatalyst coating liquid being adapted for use in the formation of a photocatalyst layer on the surface of an inorganic material base by applying the coating liquid on the surface of the inorganic material base and firing the coating.

In a second embodiment of the photocatalyst coating liquid for an inorganic material according to the present invention, the photocatalyst coating liquid comprises at least photocatalyst particles, zirconium ammonium carbonate, and an alkali silicate and is basic, the photocatalyst coating liquid being adapted for use in the formation of a photocatalyst layer on the surface of an inorganic material base by applying the coating liquid on the surface of the inorganic material base and firing the coating.

The photocatalyst coating liquid for an inorganic material according to the present invention is suitable for the production of the inorganic material according to the present invention. Accordingly, the inorganic material base to be coated with the coating liquid may be the same as described above in connection with the above inorganic material according to the present invention. One base selected from the group consisting of tiles, ceramic wares such as large ceramic ware panels, natural stones, porcelain enamels, ceramics, glass, and concrete is suitable as the inorganic material base. Ceramic ware bases may be any of ceramic bases, stoneware bases, and porcelain bases. Further, both glazed products and unglazed products can be utilized. The shape and applications are also not particularly limited. The present invention is suitable in building materials, interiors, exteriors, windows, toilet bowls, washbowls, sinks, unit kitchens, tomb stones, bridge beams, bridges, insulators, ceramic ware plugs and the like.

In a preferred embodiment of the coating liquid in the present invention, the content of the alkali silicate based on the whole solid content of the photocatalyst coating liquid for an inorganic material is preferably 3% by mass (inclusive) to 20% by mass (exclusive), more preferably 4% by mass (inclusive) to 15% by mass (exclusive), most preferably 5% by mass (inclusive) to 10% by mass (exclusive), in terms of $SiO_2$.

The photocatalyst particles contained in the photocatalyst coating liquid for an inorganic material according to the present invention are not particularly limited as long as the particles have a photocatalytic activity after firing. Examples of preferred photocatalyst particles include particles of metal oxides, for example, titanium oxide such as anatase form of titanium oxide, rutile form of titanium oxide, and brookite form of titanium oxide and zinc oxide, tin oxide, strontium titanate, and tungsten oxide. Titanium oxide particles are more preferred, and anatase form of titanium oxide particles are most preferred.

In the photocatalyst coating liquid for an inorganic material according to the present invention, the mean particle diameter of the photocatalyst particles is preferably 10 nm to 100 nm, more preferably 10 nm to 60 nm.

Lithium silicate, sodium silicate, potassium silicate, mixtures thereof and the like are suitable as the alkali silicate used in the photocatalyst coating liquid for an inorganic material according to the present invention.

In the first embodiment of the photocatalyst coating liquid for an inorganic material according to the present invention, the mass ratio between the photocatalyst particles and amorphous Zr—O particles having a particle diameter D50 of 1 to 30 nm in terms of $ZrO_2$ is preferably 80/20 to 20/80, more preferably 75/25 to 30/70.

In the second embodiment of the photocatalyst coating liquid for an inorganic material according to the present invention, the mass ratio between the photocatalyst particles and the zirconium ammonium carbonate in terms of $ZrO_2$ is preferably 80/20 to 20/80, more preferably 75/25 to 30/70.

The amorphous Zr—O particles having a particle diameter D50 of 1 to 30 nm used in the photocatalyst coating liquid for an inorganic material according to the present invention may be any amorphous Zr—O particles as long as Zr and O are contained as constituent elements, and examples thereof include particles of zirconium hydroxide ($Zr(OH)_4$), zirconyl hydroxide ($ZrO(OH)_2$), hydrated zirconium oxide ($ZrO_2 \cdot xH_2O$), zirconium oxide ($ZrO_2$), and mixtures thereof.

Preferably, the photocatalyst coating liquid for an inorganic material according to the present invention contains carbonic acid chemical species at a molar ratio to Zr in Zr—O particles of 0.1 to 1.2. The carbonic acid chemical species may be chemical species produced in an aqueous solution produced when a water-soluble salt of carbonic acid is dissolved in water. Examples thereof include hydrogen carbonate ions ($HCO_3^-$) and carbonate ions ($CO_3^{2-}$). When the carbonic acid chemical species are added, the dispersibility of the coating liquid is improved. The carbonic acid chemical species are decomposed by heat treatment at 300° C. or above and thus do not adversely affect the coating liquid for an inorganic material to be fired in use.

The coating liquid for an inorganic material according to the present invention may contain one or a plurality of compounds selected from carboxylic acids or salts thereof, glycerol, and ethanolamines. The molar ratio of one or more compounds selected from carboxylic acids or salts thereof, glycerol, and ethanolamines to Zr is less than 0.2, preferably less than 0.05. These components are effective in stably maintaining the dispersion and, at the same time, are decomposed by heat treatment at 300° C. or above. Accordingly, these components do not adversely affect as a coating liquid for an inorganic material to be fired in use. Citric acid, tartaric acid, glycolic acid, lactic acid, gluconic acid and the like are suitable as the carboxylic acid, and monoethanolamine, diethanolamine, triethanolamine and the like are suitable as the ethanolamine. As described later, the object of using the carboxylic acid or salt thereof is to supply the carboxylic acid to the sol, of which the dispersoid is amorphous Zr—O particles usable as a supply source of the amorphous Zr—O particles in the coating liquid, for stabilization. Accordingly, any carboxylic acid or salt thereof may be used as long as it is dissolvable in the sol including Zr—O particles as the dispersoid and a solvent of the coating liquid. Examples thereof include ammonium salts, sodium salts, and potassium salts.

The solvent for the coating liquid for an inorganic material according to the present invention is preferably basic. The coating liquid is preferably aqueous. However, a mixture of water with ethanol may also be used. The pH value of the coating liquid is preferably 7.5 to 10.

The solid content concentration of the coating liquid for an inorganic material according to the present invention is not particularly limited but is preferably 0.5 to 20% by mass, more preferably 1 to 10% by mass, from the viewpoint of easiness of coating. The coating composition may be analyzed for component determination by subjecting the coating liquid to ultrafiltration to separate the coating liquid into a particulate component and a filtrate, analyzing the particulate component and the filtrate, for example, by infrared spectroscopy, gel permeation chromatography, or X-ray fluorescence spectroscopy, and analyzing the spectra.

The coating liquid for an inorganic material according to the present invention may contain inorganic oxide particles other than the photocatalyst particles and the zirconia particles. Such inorganic oxide particles usable herein include particles of single oxides such as alumina, ceria, yttria, boronia, magnesia, calcia, ferrite, amorphous titania, and hafnia and particles of composite oxides such as barium titanate and calcium silicate.

The photocatalyst coating liquid for an inorganic material according to the present invention may contain a surfactant as an optional component. The addition amount of the surfactant is 0 part by mass (inclusive) to 10 parts by mass (exclusive), preferably 0 part by mass to 8 parts by mass, more preferably 0 part by mass to 6 parts by mass, based on a dried product of the photocatalyst coating liquid for an inorganic material. The addition of the surfactant can realize leveling, that is, smoothing and uniformalization of the coating surface. The surfactant is a component that is effective in improving a wetting capability of the photocatalyst coating liquid for an inorganic material. When the wetting capability is not important, in some cases, the photocatalyst coating liquid is preferably substantially free from or is free from the surfactant.

The surfactant may be properly selected while taking into consideration the dispersion stability of the photocatalyst and the inorganic oxide particles and the wetting capability of the photocatalyst coating liquid when coated on an intermediate layer. Nonionic surfactants are preferred. More preferred are ether nonionic surfactants, ester nonionic surfactants, polyalkylene glycol nonionic surfactants, fluoro nonionic surfactants, and silicone nonionic surfactants.

Amorphous Zr—O Particles

Preferably, Zr—O particles used in the present invention are supplied from a sol including amorphous Zr—O particles as a dispersoid, because the particle diameter D50 can be maintained in a monodispersed state and the Zr—O particles can easily be introduced into the photocatalyst coating liquid for an inorganic material. The particle diameter D50 of the amorphous Zr—O particles as the dispersoid of the sol is preferably 1 to 30 nm. When the particle diameter D50 is in the above-defined range, thickening or agglomeration of the sol does not occur and, thus, the sol is stable. Further, in an inorganic material as the final product, the BET specific surface area and the mean crystallite diameter of zirconia particles are in respective predetermined ranges.

Further, preferably, the sol contains carbonic acid chemical species as a stabilizer from the viewpoint of stably dispersing a dispersoid in the sol per se and the coating liquid after preparation from the sol. Among known dispersion stabilizers for the amorphous Zr—O particles, carbonic acid chemical species are decomposed and volatilized at the lowest temperature. In general, preferably, starting material-derived impurities do not remain in the photocatalyst layer. Accordingly, the carbonic acid chemical species that can be completely decomposed and volatilized under conditions according to the present invention is optimal as a stabilizer for a sol used as a starting material for the photocatalyst coating liquid for an inorganic acid used in the formation of the photocatalyst layer on the surface of the inorganic material base by firing. The carbonic acid chemical species may be any chemical species that, when a soluble salt of carbonic acid is dissolved in water, are produced in the solution. Examples thereof include hydrogen carbonate ions ($HCO_3^-$) and carbonate ions ($CO_3^{2-}$).

The sol may also contain one or a plurality of compounds selected from carboxylic acids or salts thereof, glycerol, and ethanolamines. The molar ratio of one or more compounds selected from carboxylic acids or salts thereof, glycerol, and ethanolamines to Zr is less than 0.2, preferably less than 0.05.

These components are effective in stably maintaining the dispersion and, at the same time, are decomposed by heat treatment at 300° C. or above. Accordingly, these components do not adversely affect as a coating liquid for an inorganic material to be fired in use. Citric acid, tartaric acid, glycolic acid, lactic acid, gluconic acid and the like are suitable as the carboxylic acid, and monoethanolamine, diethanolamine, triethanolamine and the like are suitable as the ethanolamine. The object of using the carboxylic acid or salt thereof is to supply the carboxylic acid to the sol for stabilization. Accordingly, any carboxylic acid or salt thereof may be used as long as it is dissolvable in the solvent. Examples thereof include ammonium salts, sodium salts, and potassium salts.

The carboxylic acid or salt thereof, glycerol, and ethanolamines are not necessarily contained. These additives have higher stabilization than the carbonic acid chemical species and may be added according to the stability of dispersion necessary for the sol and coating liquid including amorphous Zr—O particles as a dispersoid.

It is considered that, when a sol including carbonic acid chemical species-containing amorphous Zr—O particles as a dispersoid is used, part or the whole of the dispersion stabilizer for the sol and the coating liquid can be covered by carbonic acid chemical species that are easily be decomposed and volatilized, whereby a design of a photocatalyst layer containing a lowest level of impurities is possible. It is considered that the low level of impurities can realize the development of a higher specific surface area when the photocatalyst layer is formed as the coating liquid. Components other than the above components contained in the sol including amorphous Zr—O particles as a dispersoid are not particularly limited and may be controlled according to quality required in the final product. The solvent for the sol is preferably water. A mixture of water with ethanol or the like may also be used.

An example of a process for producing a sol including the amorphous Zr—O particles as a dispersoid will be described. For example, a reactive dispersion that includes zirconium hydroxide, an acid, and a solvent and is disclosed in JP 2007-70212A is prepared so as to meet the following requirement:

$$3 \leq X \leq 20 \text{ and } (2.0-0.07X) \leq Y \leq (3.0-0.08X)$$

wherein X represents the concentration of zirconium in terms of $ZrO_2$, % by weight; and Y represents the number of gram equivalents of the acid per mol of Zr. The reactive dispersion is then heated to 80° C. (preferably 90° C.) or above to obtain a sol including amorphous Zr—O particles as a dispersoid. Conventional sols including this sol may be used as a starting material.

Carbonic acid chemical species are then supplied to the sol including amorphous Zr—O particles as the dispersoid. Supply sources for carbonic acid chemical species include powders or aqueous solutions of ammonium carbonate, ammonium hydrogen carbonate, sodium carbonate, sodium hydrogen carbonate, potassium carbonate, potassium hydrogen carbonate, cesium carbonate, and cesium hydrogen carbonate, and solutions obtained by absorbing carbon dioxide in basic aqueous solutions of, for example, ammonia, alkali hydroxides, or amines. That is, all of compounds that can supply carbonic acid chemical species can be used.

In the present invention, only the molar ratio of carbonic acid chemical species to Zr in the final sol is specified, and the molar ratio of carbonic acid chemical species to Zr in the production process is not limited. The addition amount of the carbonic acid chemical species to the sol including amorphous Zr—O particles as the dispersoid is generally suitably 0.1 to 1.2, more preferably 0.3 to 1.0, in terms of molar ratio of the carbonic acid chemical species to Zr. Further, it is considered that, among the carbonic acid chemical species, those that has the function of giving a negative potential to the surface of the Zr—O particles are mainly hydrogen carbonate ions ($HCO_3^-$) and carbonate ions ($CO_3^{2-}$). Accordingly, a higher level of dispersion stability can be obtained by regulating the pH value of the sol with carbonic acid chemical species added thereto to a basic pH value so as to enhance the concentration of these chemical species.

Ammonia, alkali hydroxides, and amines such as dimethylamine, ethylamine, diethylamine, tetramethyl ammonium hydroxide, tetrabutyl ammonium hydroxide, and dimethylamino ethanol are usable solely or in a combination of two or more of them for pH adjustment. Preferably, these compounds are added so that the pH value of the sol is brought to 7 to 12. When the pH value exceeds 12, bases such as ammonia, alkali metals, or amines contained in the sol are excessive and, thus, there is a possibility of adverse effect on the quality of the photocatalyst coating liquid for an inorganic material using the sol as a starting material and the final product.

The addition of one or more compounds selected from carboxylic acids or salts thereof, glycerol, and ethanolamines can also contribute to dispersion stability of the sol. The addition amount is such that the sum of the molar ratios of the carboxylic acid or salt thereof, glycerol, and ethanol amines to Zr is less than 0.2, preferably less than 0.1, more preferably less than 0.05. Since the sol (starting material) including amorphous Zr—O particles as a dispersoid sometimes contains impurities such as hydrochloric acid, nitric acid, and metal ions, if necessary, the sol may be purified and concentrated by ultrafiltration, dialysis, reverse osmosis or other methods to remove the impurities.

The order of addition of the carbonic acid chemical species, ammonia, alkali hydroxides and amines for pH adjustment, and one or more of compounds selected from carboxylic acids or salts thereof, glycerol and ethanolamines to the sol including the amorphous Zr—O particles as the dispersoid is not particularly limited. In order to prevent agglomeration of the amorphous Zr—O particles, preferably, a method is adopted in which the carbonic acid chemical species, the ammonia, alkali hydroxide and amines for pH adjustment, and one or more compounds selected from the carboxylic acids or salts thereof, glycerol, and ethanolamines are added in that order, or a method in which a liquid obtained by dissolving the carbonic acid chemical species, the ammonia, alkali hydroxide and amines for pH adjustment, and one or more compounds selected from the carboxylic acids or salts thereof, glycerol, and ethanolamines in a solvent is stirred, and, in this state, the sol is added to the solution. The process for producing a sol that includes amorphous Zr—O particles as a dispersoid and is usable in the present invention is not limited to the above process. However, the above process is best suited from the viewpoints of production efficiency and the accuracy of regulation of the particle diameter D50 of the sol.

In the present invention, the particle diameter D50 means a particle diameter that, when particle diameters of the sol are measured by a laser Doppler method, the volume equivalent cumulative frequency is 50%.

EXAMPLES

The present invention is further illustrated by the following Examples that are not intended as a limitation of the invention.

Preparation Example 1

Preparation of Sol Containing Amorphous Zr—O Particles having Diameter D50 of 1 to 30 nm Zirconium hydroxide (content: 30% by weight in terms of $ZrO_2$) (300 g) was dispersed in 1070 g of pure water, and 126 g of 67.5% by weight of nitric acid was added thereto with proper stirring to prepare a reactive dispersion. This dispersion was held at 95° C. for 24 hr. After cooling, the dispersion was purified by ultrafiltration to obtain a nitric acid-acidified sol (Z1) that included 10% by weight, in terms of $ZrO_2$, of amorphous Zr—O particles as a dispersoid and had pH 3.2.

Ammonium hydrogencarbonate (49 g) was added to 1000 g of the nitric acid-acidified sol (Z1) thus obtained. Next, 29 g of aqueous ammonia (25% by weight) and 18 g of triethanolamine were added, and 1343 g of water was added to the nitric acid-acidified sol (Z1) to obtain a sol that included 4.1% by weight, in terms of $ZrO_2$, of amorphous Zr—O particles and had pH 9.3. This sol was purified and concentrated by ultrafiltration, and the concentrate was brought to pH 9.4 by the addition of aqueous ammonia (25% by weight). The solution was diluted with pure water to finally obtain a sol containing 7% by weight, in terms of $ZrO_2$, of amorphous Zr—O particles, 0.4% by weight of $NH_4$, 1.3% by weight of $CO_3$, and 0.7% by weight of triethanolamine. The $CO_3$/Zr molar ratio of the resultant sol was 0.4.

Preparation Example 2

Preparation of Sol Containing Amorphous Zr—O Particles having Diameter D50 of 1 to 30 nm Anhydrous citric acid (64 g) was added to 1000 g of the nitric acid-acidified sol (Z1) obtained in the process of Preparation Example 1, and 120 g of aqueous ammonia (25% by weight) was added thereto to obtain a sol that included 6% by weight, in terms of $ZrO_2$, of amorphous Zr—O particles and had pH 9.5. This sol was purified and concentrated by ultrafiltration to obtain a sol containing 10% by weight, in terms of $ZrO_2$, of amorphous Zr—O particles, 0.5% by weight of $NH_4$, and 4.5% by weight of citric acid. The citric acid/Zr molar ratio of the resultant sol was 0.3.

Example 1

An anatase titanium oxide sol having a mean crystallite diameter of 7 nm and a primary particle diameter of 50 nm, an alkali silicate, a sol containing amorphous Zr—O particles having a particle diameter D50 of 1 to 30 nm obtained in Preparation Example 1, and a solvent were mixed together so that the mass ratio among titanium oxide particles, alkali silicate, and amorphous Zr—O particles in terms of $ZrO_2$ was 45:3:52, thereby preparing a photocatalyst coating liquid (A1). Here water was used as the solvent.

An anatase titanium oxide sol having a mean crystallite diameter of 7 nm and a primary particle diameter of 50 nm, an alkali silicate, a sol containing amorphous Zr—O particles having a particle diameter D50 of 1 to 30 nm obtained in Preparation Example 1, and a solvent were mixed together so that the mass ratio among the titanium oxide particles, the alkali silicate, and the amorphous Zr—O particles in terms of oxide was 50:8:80, thereby preparing a photocatalyst coating liquid (A2). Here water was used as the solvent.

An anatase titanium oxide sol having a mean crystallite diameter of 7 nm and a primary particle diameter of 50 nm, an alkali silicate, a sol containing amorphous Zr—O particles having a particle diameter D50 of 1 to 30 nm obtained in Preparation Example 1, and a solvent were mixed together so that the mass ratio among the titanium oxide particles, the alkali silicate, and the amorphous Zr—O particles in terms of oxide was 24:8:80, thereby preparing a photocatalyst coating liquid (A3). Here water was used as the solvent.

An anatase titanium oxide sol having a mean crystallite diameter of 7 nm and a primary particle diameter of 50 nm, an alkali silicate, a sol containing amorphous Zr—O particles having a particle diameter D50 of 1 to 30 nm obtained in Preparation Example 1, and a solvent were mixed together so that the mass ratio among the titanium oxide particles, the alkali silicate, and the amorphous Zr—O particles in terms of oxide was 41:4:32, thereby preparing a photocatalyst coating liquid (A4). Here water was used as the solvent.

The photocatalyst coating liquids (A1) to (A4) were spray-coated on grazed tiles (T1) peheated to 80 to 150° C. to obtain tiles (B1) to (B4).

The tiles (B1) to (B4) were then fired for 10 to 20 sec at an in-furnace atmosphere temperature of 800 to 1100° C. (with a thermocouple being installed in a place around a burner where the thermocouple is not directly exposed to the flame) with a heating element having a heating value per unit area of 1000 MJ/$m^2$·h while setting the distance from the heating element to the surface coated with the coating liquid to 5 mm to 300 mm. As a result, grazed tiles (C1) to (C4) with an about 0.5 μm-thick photocatalyst layer formed on a surface thereof were prepared. The surface temperature of the grazed tile samples (C1) to (C4) immediately after the tiles were taken out from the furnace were 300 to 400° C.

The photocatalyst-derived NOx decomposition function and the abrasion resistance were confirmed for the samples (C1) to (C4).

The photocatalyst-derived NOx decomposition function was examined by a testing method specified in JIS (Japanese Industrial Standards) R 1701-1 "Test method for air purification performance of photocatalytic materials—Part 1: Removal of nitric oxide." As a result, the photocatalyst-derived NOx decomposition function ΔNOx was 2.3 μmol for (C1), 1.5 μmol for (C2), 1.3 μmol for (C3), and 1.1 μmol for (C4). That is, the results were good.

For the abrasion resistance, after the surface of the sample was slid 1200 times with a nylon brush, the photocatalytic function retention was then confirmed by a silver nitrate color test. Specifically, an aqueous silver nitrate solution (concentration: 1%) was coated on a photocatalyst layer, and the coating was irradiated with light emitted from a BLB lamp at an illuminance of 2 mW/$cm^2$ for 20 min, and excess silver nitrate was washed away. This test was carried out before and after brushing, and a color difference change ΔE between before and after brushing was determined. For all the samples, ΔE was more than 15, and, particularly for (C1), ΔE was 33. That is, the results were good.

Reference Examples

For the Zr—O particle-containing sols prepared in Preparation Examples 1 and 2 and an aqueous zirconium ammonium carbonate solution, firing was carried out at various temperatures, and a change in a BET specific surface area ($m^2$/g) and a mean crystallite diameter over temperature was examined. The results on the BET specific surface area and the results on the crystal form and the mean crystallite diameter (nm) were as shown in Tables 1 and 2, respectively. The mean crystallite diameter was determined by powdery X-ray diffractometry, that is, by separating peaks that appeared around 2θ=27 to 29° after the removal of background to determine the crystal form, determining the half value width of monoclinic peaks (M(111) and M(11-1)) and a tetragonal peak T(111), making a calculation based on the Scherrer equation, and, when the number of peaks is one, adopting the obtained value as the mean crystallite diameter, or when number of peaks is two or more, adopting the mean value as the mean crystallite diameter.

TABLE 1

| Firing temp. | Preparation Example 1 | Preparation Example 2 | Zirconium ammonium carbonate |
|---|---|---|---|
| 250° C. | 180 | 198 | 3 |
| 400° C. | 95 | 107 | 2 |
| 600° C. | 12 | 25 | 19 |

TABLE 2

| | Preparation Example 1 | | Preparation Example 2 | | Zirconium ammonium carbonate | |
|---|---|---|---|---|---|---|
| Firing temp. | Crystal form | Mean crystal diameter | Crystal form | Mean crystal diameter | Crystal form | Mean crystal diameter |
| 250° C. | Amorphous | — | Amorphous | — | Amorphous | — |
| 400° C. | T | 8 | T | 7 | Amorphous | — |
| 600° C. | T.M. | 11 | T.M | 11 | T | 18 |
| 800° C. | M | 22 | M | 23 | T.M | 18 |

In the table, T represents tetragonal crystal, and M represents monoclinic crystal.

The invention claimed is:

1. An inorganic material comprising: an inorganic material base; and a photocatalyst layer provided on the surface of the inorganic material base, wherein:
   the photocatalyst layer is formed by firing; and
   the photocatalyst layer comprises photocatalyst particles, crystalline zirconia particles having a mean crystallite diameter of less than 20 nm, and a BET specific surface area of not less than 10 $m^2$/g and an alkali silicate.

2. The inorganic material according to claim 1, wherein the content of the alkali silicate in the photocatalyst layer is 0.5% or more by mass to less than 20% by mass in terms of $SiO_2$.

3. The inorganic material according to claim 1, wherein the inorganic material base is one base selected from the group consisting of ceramic wares, natural stones, porcelain enamels, ceramics, glass, and concrete.

4. A process for producing an inorganic material according to claim 1,
the process comprising: applying a coating liquid on the surface of an inorganic material base, the coating liquid comprising at least photocatalyst particles, amorphous Zr—O particles having a particle diameter D50 of 1 to 30 nm, and an alkali silicate; and then bringing the temperature of the surface to 300° C. or more to less than 800° C. to form a photocatalyst layer, or
the process comprising: applying a coating liquid on the surface of an inorganic material base, the coating liquid comprising photocatalyst particles, zirconium ammonium carbonate, and an alkali silicate; and then bringing the temperature of the surface to more than 400° C. to 800° C. or less to form a photocatalyst layer.

5. The process for producing an inorganic material according to claim 4, wherein the inorganic material base is one base selected from the group consisting of ceramic wares, natural stones, porcelain enamels, ceramics, glass, and concrete.

6. A method for decomposing a harmful gas, comprising bringing an inorganic material according to claim 1 into contact with a gas containing a harmful gas.

* * * * *